United States Patent [19]

Hattori et al.

[11] 4,051,817

[45] Oct. 4, 1977

[54] FUEL INJECTION SYSTEM FOR AN INTERNAL COMBUSTION ENGINE

[75] Inventors: Tadashi Hattori, Nishio; Takamichi Nakase, Gamagori; Minoru Nishida, Okazaki, all of Japan

[73] Assignee: Nippon Soken, Inc., Japan

[21] Appl. No.: 556,953

[22] Filed: Mar. 10, 1975

[30] Foreign Application Priority Data

Apr. 18, 1974 Japan .................................. 49-43566

[51] Int. Cl.$^2$ .............................................. F02B 3/00
[52] U.S. Cl. ............................ 123/32 EA; 123/32 EF
[58] Field of Search .......... 123/32 EA, 117 R, 32 EF

[56] References Cited

U.S. PATENT DOCUMENTS

| | | | |
|---|---|---|---|
| 3,430,616 | 3/1969 | Glockler et al. | 123/32 EA |
| 3,685,526 | 8/1972 | Hoto et al. | 123/32 EA |
| 3,727,592 | 4/1973 | Wilkinson | 123/32 EA |
| 3,742,918 | 7/1973 | Murtin et al. | 123/32 EA |
| 3,750,631 | 8/1973 | Scholl et al. | 123/32 EA |
| 3,754,537 | 8/1973 | Wessel et al. | 123/32 EA |
| 3,890,944 | 6/1975 | Werner et al. | 123/117 R |

Primary Examiner—Ronald H. Lazarus
Assistant Examiner—Tony M. Argenbright
Attorney, Agent, or Firm—Cushman, Darby & Cushman

[57] ABSTRACT

There is provided a fuel injection system for an internal combustion engine comprising fuel injection means provided for each of the cylinders of the engine, a main computing circuit for determining the timing of the injection and the duration of the injection in accordance with the charging and discharging of electric energy corresponding to the number of revolutions of the engine and the quantity of air drawn thereinto and generating pulse signals, a distribution circuit for distributing the pulse signals to the fuel injection means, and a reference signal generating circuit for generating an electric signal to complete the charging of electric energy in the main computing circuit within 720°/(2 × the number of cylinders) of crank travel, whereby the construction of the system is simplified since there is no need to modify in any way the conventional fuel injection valves or the like and provide the main computing circuit for each of the cylinders, and moreover fuel can be separately injected into each cylinder in turn in accordance with the firing order of the engine.

4 Claims, 4 Drawing Figures

FUEL INJECTION SYSTEM FOR AN INTERNAL COMBUSTION ENGINE

BACKGROUND OF THE INVENTION

1. Field of the Invention

The present invention relates to a fuel injection system for an internal combustion engine in which fuel is separately injected into each cylinder in turn in accordance with the firing order of the engine.

2. Description of the Prior Art

In known fuel injection systems for internal combustion engines of the above type, the main computing means for determining the timing and duration of the opening of the electromagnetically operated fuel injections valves, i.e., the timing of the fuel and the time duration of the injection are of the monostable circuit type which accomplishes the charging and discharging of electric energy in accordance with the engine rotational angle reference signals (the engine crankshaft rotational angle reference signals) and the air volume signals. A disadvantage of this type of fuel injection systems is that in the case of the four-cylinder engine operating at high speeds (under high speed, high load operating conditions), for example, the interval between the pulse signals generated from the monostable circuit becomes longer than that of the rotational angle reference signals (four pulses are generated for every one complete engine revolution) so that in order to separately inject fuel into each cylinder in turn in accordance with their firing order, the main computing means including the monostable circuit must be provided for each of the cylinders thus making the fuel injection system expensive to manufacture and complicate in construction. Another disadvantage is that if the valve opening area of the fuel injection valves is increased to decrease the duration of the opening of the fuel injection valves and thereby to eliminate the necessity of providing the main computing means for each of the cylinders, voltage and temperature changes result in unstable operation of the fuel injection valves and thus the controls which meet the requirements cannot be accomplished.

SUMMARY OF THE INVENTION

With a view to overcoming the foregoing difficulty, it is the object of the present invention to provide a fuel injection system for an internal combustion engine comprising fuel injection means provided for each of the engine cylinders, main computing means for determining the timing of the fuel injection and the duration of the injection by charging and discharging electric energy in accordance with the number of revolutions of the engine and the quantity of air drawn thereinto and generating pulse signls, distributing means for distributing the pulse signals to the fuel injection means, and reference signal generating means for generating electric signals to terminate the charging of electric energy in the main computing means within 720°(2 × the number of cylinders of crank travel.

The fuel injection system of the present invention has among its great advantages the fact that it is simple in construction since there is no need to modify the fuel injection means such as fuel injection valves and provide the main computing means for each of the engine cylinders, and moreover fuel can be separately injected into each cylinder in turn in accordance with their firing order by means of the single main computing means.

DESCRIPTION OF THE PREFERRED EMBODIMENT

The present invention will now be described in greater detail with reference to the illustrated embodiment.

Figure 1:
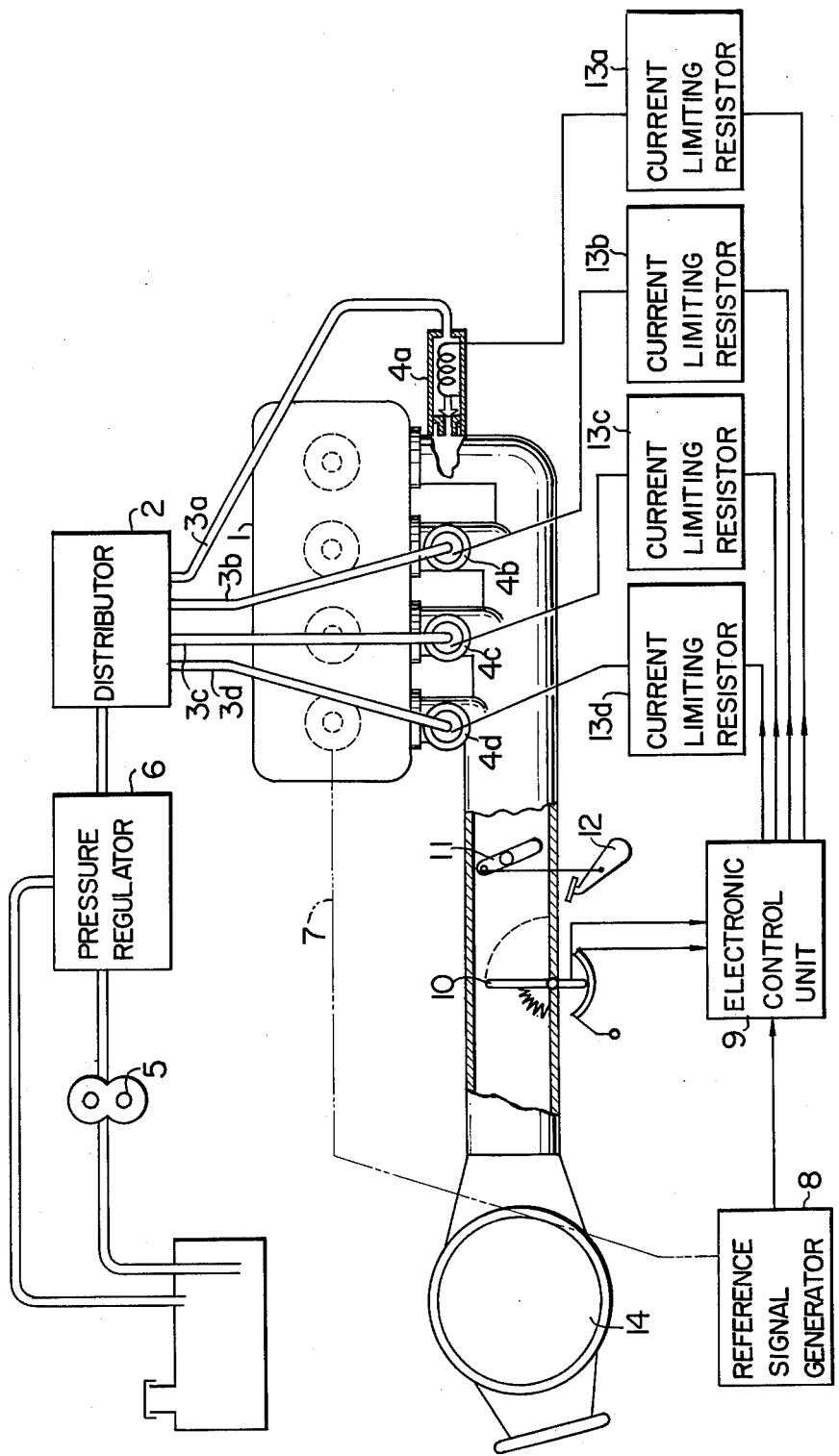
FIG. 1 is a schematic diagram of an internal combustion engine equipped with a fuel injection system according to the present invention.

Referring first to FIG. 1, numeral 1 designates a four-cylinder, four-cycle internal combustion engine, 2 a distributor for distributing fuel through fuel lines 3a, 3b, 3c and 3d to electromagnetically-operted fuel injection valves 4a, 4b, 4c and 4d provided for the respective cylinders, 5 a fuel feed pump, 6 a pressur eregulator for controlling the fuel pressure at a fixed value, 7 the crankshaft of the engine 1, 8 a reference signal generator for generating reference signals in accordance with the rotation of the crankshaft 7, 9 an electronic control unit, 10 an air-flow sensor of a weir plate type, for example, which is positioned in the suction duct of the engine 1, 11 a throttle valve linked to an accelerator pedal 12, 13a, 13b, 13c and 13d current limiting resistors, 14 an air cleaner.

Figure 2:
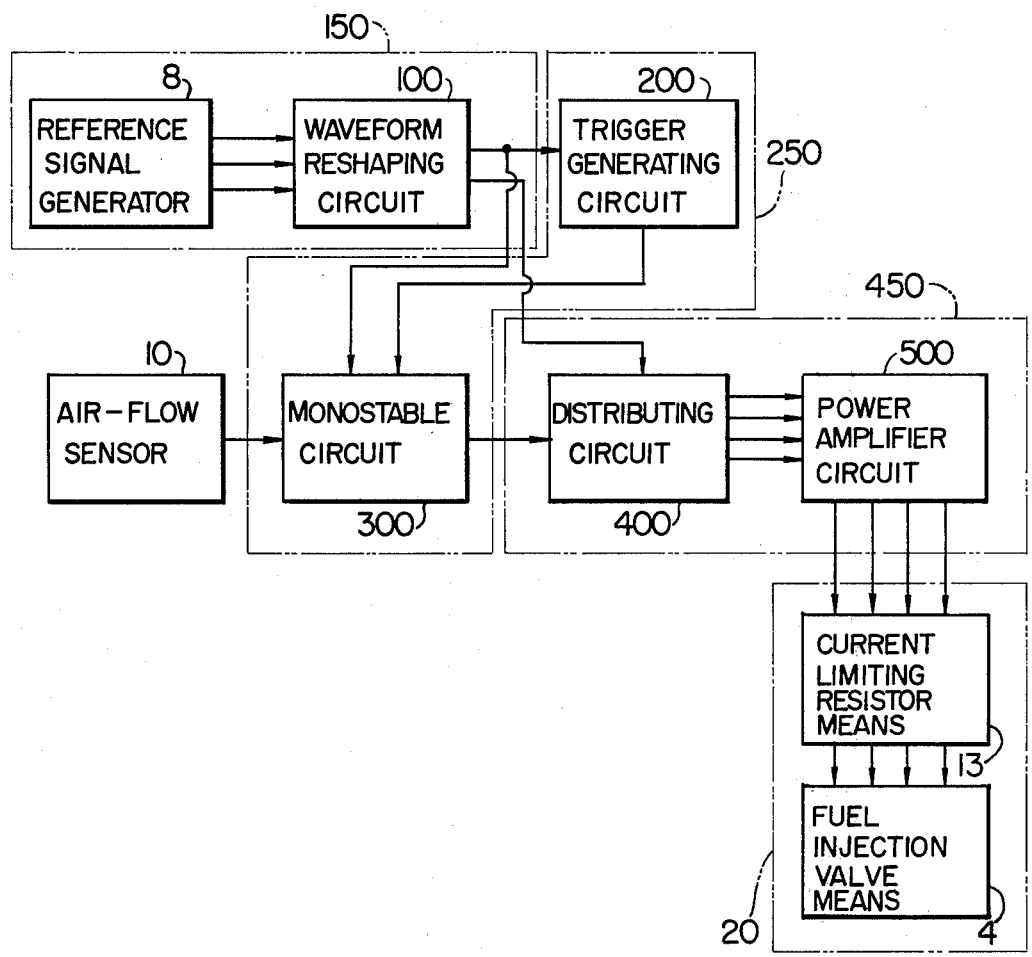
FIG. 2 is a block diagram showing an embodiment of the fuel injection system according to the invention.

In FIG. 2 showing a block diagram of an embodiment of the invention comprising principally the electronic control unit 9, the reference signal generator 8 and a waveform reshaping circuit 100 constitute reference signal generating means 150, and numeral 10 designates the air-flow sensor. A trigger generating circuit 200 and a monostable circuit 300 for generating pulse signals by charging and discharging electric energy constitute main computing means 250, a distributing circuit 400 and a power amplifier circuit 500 constitute distributing means 450, and current limiting resistor means 13 (a general term for the current limiting resistors 13a, 13b, 13c and 13d) and fuel injection valve means 4 (a general term for the fuel injection valves 4a, 4b, 4c and 4d) constitute fuel injection means 20.

Figure 3:
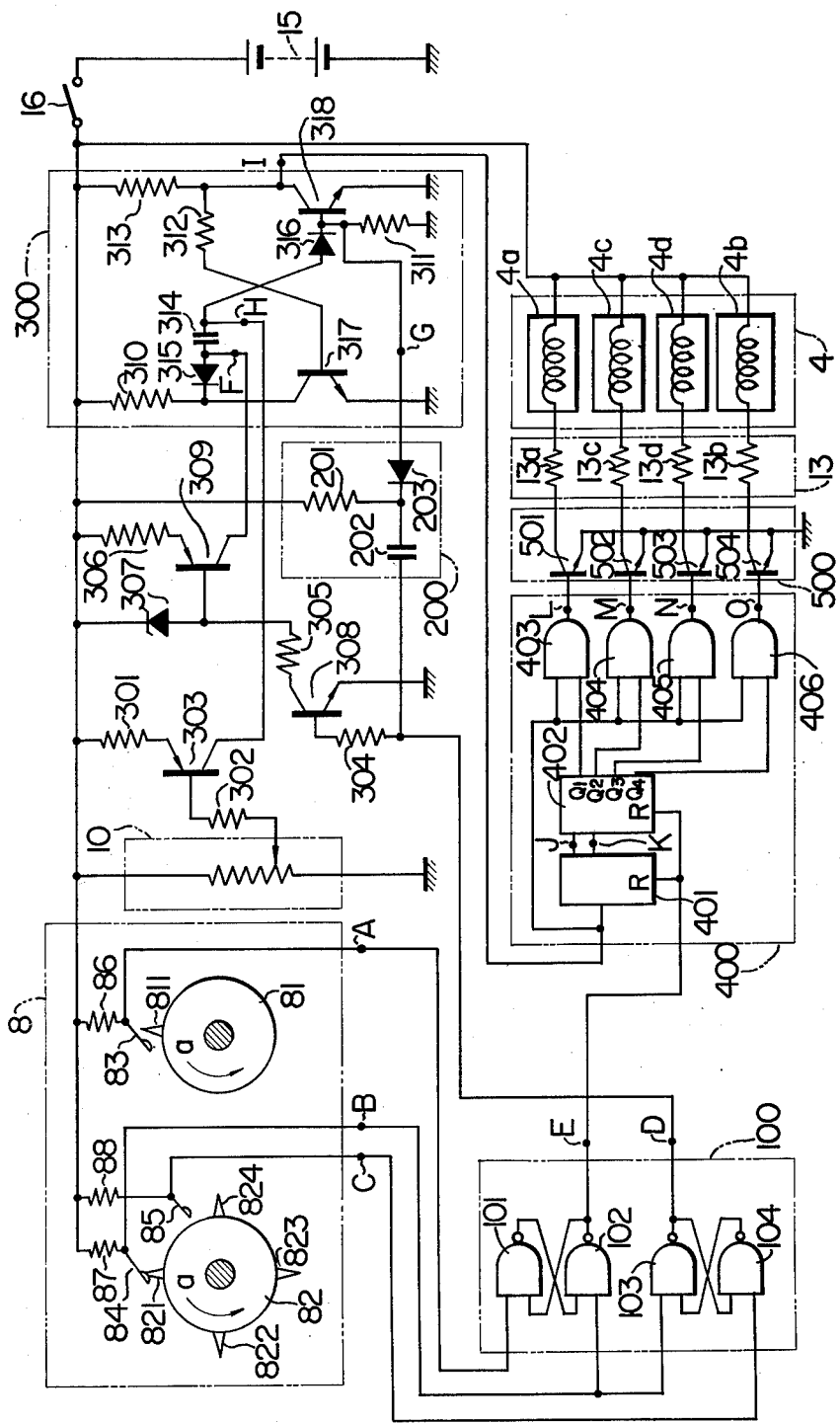
FIG. 3 is a wiring diagram for the embodiment of FIG. 2.

In FIG. 3 showing a specific wiring diagram of the embodiment of FIG. 2, numerals 81 and 82 designate an electrically conductive first rotor and second rotor which are directly connected to the cam shaft of the engine 1, 83, 84 and 85 conductive detecting contacts which are respectively connected to a source of power through resistors 86, 87 and 88. The first rotor 81 is formed with a projection 811 and the second rotor 82 is provided with projections 821, 822, 823 and 824 arranged at regular intervals. The rotors 81 and 82 are rotated once in the direction of arrows a for every two complete revolutions of the crankshaft 7 of the engine 1, so that the projection 811 and the detecting contact 83 are closed when the crank is at an angle of 0° (the crank angle at the beginning of the intake stroke in the first cylinder of the engine 1), and the detecting contacts 84 and 85 come into contact with the projections 821, 822, 823 and 824 when the crank is at the angles of $\beta°$ ($\beta$ is a general term for $\beta_1, \beta_2, \beta_3$ and $\beta_4$ that will be described later) and $\alpha°$ ($\alpha$ is a general term for $\alpha_1$, $\alpha_2$, $\alpha_3$ and $\alpha_4$ that will be described later). The detecting contacts are closed in the sequence 84, 83 and 85, and the detecting contacts 83, 84 and 85 are arranged so that the degrees of crankshaft rotation (the degrees of crank travel) between the closing of the detecting contact 84 and that of the detecting contact 85 are less than 90°. NAND gates 101 and 102 and NAND gates 103 and 104 respectively constitute an R-S flip-flop, and the NAND gates 101, 102, 103 and 104 have their one inputs respectively connected to the detecting contacts 83, 84 and 85. A resistor 201, a capacitor 202 and a diode 203 consititute the trigger generating circuit 200. Numerals 301 and 302 designate resistors, 303 a transistor whose collector current increases as the output voltage of the air-flow sensor 10 descreases (the quantity of air drawn in decreases). Numerals 304, 305 and 306 designate resistors, 307 a Zener diode, 308 and 309 transistors which are adapted so that a fixed current flows to the collector of the transistor 309 when the transistor 308 is turned on. Resistors 310, 311, 312 and 313, a capacitor 314, diodes 315 and 316 and transistors 317 and 318 constitute the monostable circuit 300, and the ends of the capacitor 314 are respectively connected to the collector of the transistors 303 and 309. A two-stage counter 401, a decoder 402 and AND gates 403, 404, 405 and 406 constitute the distributing circuit 400, and the output terminal of the NAND gate 102 in the waveform reshaping circuit 100 is connected to the reset terminal (R) of the two-stage counter 401 and the decoder 402. Transistors 501, 502, 503 and 504 constitute the power amplifier circuit 500, and the transistors 501, 502, 503 and 504 have their bases connected respectively to the output terminals of the AND gates 403, 404, 405 and 406 and their collectors connected respectively to the power source through the resistors 13a, 13b, 13c and 13d and the exciting coils of the fuel injection valves 4a, 4b, 4c and 4d. Numeral 15 designates the power source, 16 a key switch.

Figure 4:
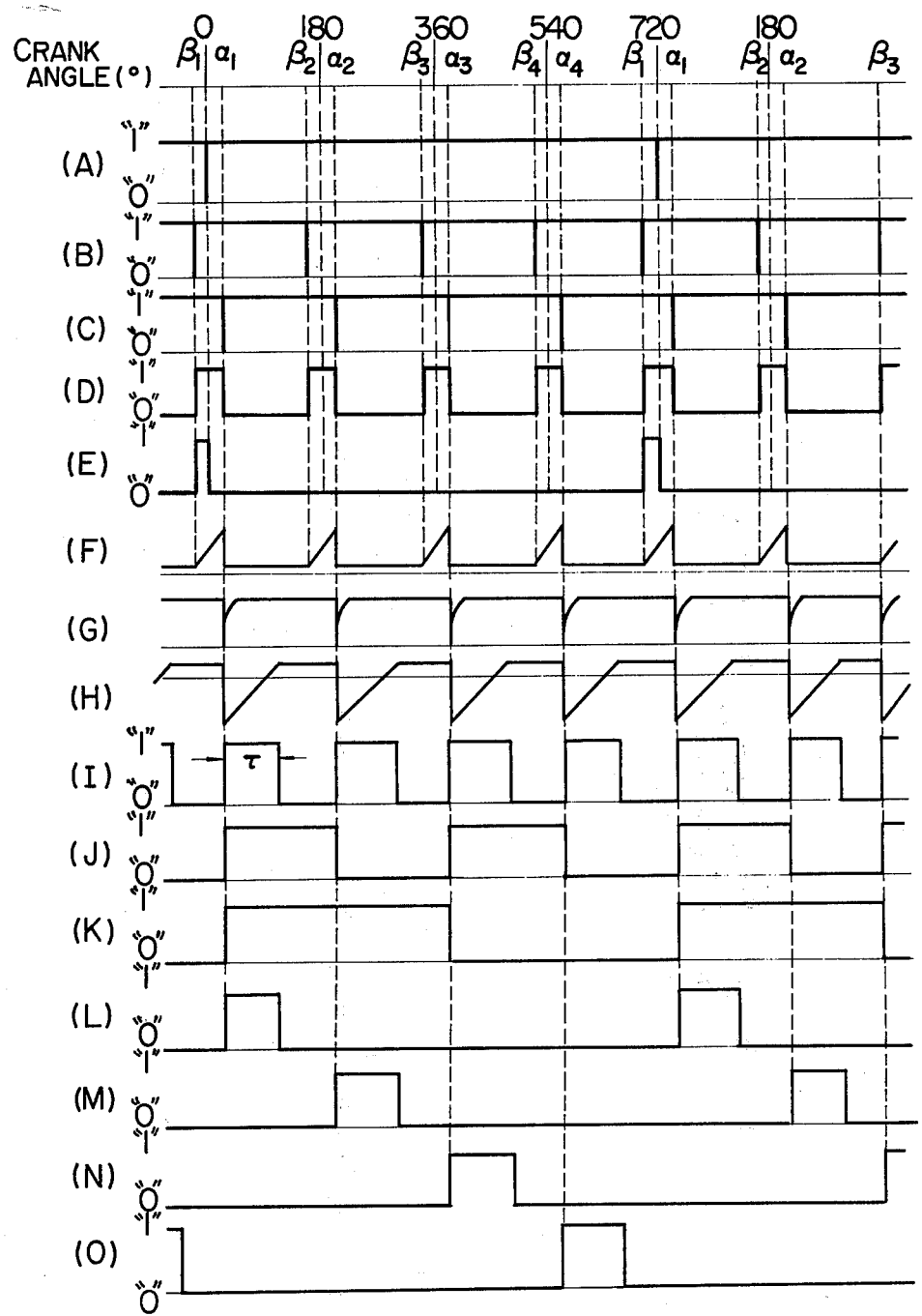
FIG. 4 is a diagram showing the signal waveforms generated at various points in the circuity of FIG. 3 which are useful for explaining the opertion of the embodiment of the invention.

With the construction described above, the operation of the fuel injection system of this invention will now be described with reference to FIGS. 3 and 4. Each time the crank is at an angle of 0° (or 720°), the detecting contact 83 and the projection 811 on the first rotor 81 in the reference signal generator 8 are closed and the low level signal (hereinafter referred to as a "0" signal) shown by the waveform (A) of FIG. 4 is generated at a point A in FIG. 3. On the other hand, in the like manner as the first rotor 81, the second rotor 82 is rotated along with the rotation of a cam shaft which is not shown (i.e., it is rotated once for every two complete revolutions of the crankshaft 7), so that the detecting contact 84 is closed at intervals of 180° crank travel, i.e., at each of the crank angles $\beta_1°$, $\beta_2°$, $\beta_3°$ and $\beta_4°$, and the "0" signal is generated at a position B in FIG. 3 at each of the crank angles $\beta_1°$, $\beta_2°$, $\beta_3°$ and $\beta_4°$ as shown by the waveform (B) of FIG. 2. Similarly, as shown by the waveform (C) of FIG. 4, the closing of the detecting contact 85 generates the "0" signal at a point C in FIG. 3 at each of the crank angles $\beta_1°$, $\beta_2°$, $\beta_3°$ and $\beta_4°$. The R-S flip-flops in the waveform reshaping circuit 100 are set and reset in accordance with the said "0" signals, and the "1" signal shown by the waveforms (D) and (E) of FIG. 4 are respectively generated at points D and E of FIG. 3. In other words, the "1" signal is generated at the output terminal (the point D) of the NAND gate 103 for the $\beta_1° - \beta_1°$, $\beta_2° - \beta_2°$, $\beta_3° - \beta_3°$ and $\beta_4° - \beta_4°$ of crank travel, respectively, and the "1" signal is generated at the output terminal (the point E) of the NAND gate 102 for the crank-angle time of $\beta_1° - 0°$ (or $\beta_1° - 720°$). When the "1" signal is generated at the point D, the transistor 308 is turned on and the fixed current flows to the collector of the transistor 309 thus charging the capacitor 314 in the monostable circuit 300. Consequently, as shown by the waveform (F) of FIG. 4, the potential at one end (a point F) of the capacitor 314 rises at the instant that the signal at the point D goes from the "0" to "1". During this period, the transistor 318 is turned on through the diode 316 by the collector current of the transistor 303 which is dependent on the output voltage of the air-flow sensor 10 and the resistance value of the resistor 301. At the instant that the signal at the point D goes from the "1" to "0" so that the charging of the capacitor 314 is terminated, the negative trigger pulse shown by the waveform (G) of FIG. 4 is generated at a point G or the output terminal of the trigger generating circuit 200 so that the transistor 318 is turned off and the signal at a point I or the output terminal of the monostable circuit 300 goes from the "0" to "1". When the transistor 318 is turned off, current flows to the base of the transistor 317 through the resistors 313 and 312 to turn it on and the potential at the point F or the end of the capacitor 314 declines abruptly. The charge stored in the capacitor 314 during the charging time is discharged and dissipated by the collector current of the transistor 303 corresponding to the quantity of air drawn in. While the potential at the other end of the capacitor 314 or a point H rapidly drops to a negative potential at the instant that the trigger generating circuit 200 generates the negative trigger pulse, the potential at the point H is caused to rise again as shown by the waveform (H) of FIG. 4 by the collector current of the transistor 303 and the transistor 318 is again turned on. When the transistor 318 is in the nonconductive state, the "1" pulse signal shown by the waveform (I) of FIG. 4 and having a pulse width $\tau$ is generated at the point I or the output terminal of the monostable circuit 300. In this case, as the amount of air drawn in increases and hence the output voltage of the air-flow sensor 10 increases, the collector current of the transistor 303 decreases and hence the pulse width $\tau$ increases. On the other hand, as the number of revolutions of the engine 1 increases, the charging time of the capacitor 314 decreases, that is, the voltage across the capacitor 314 decreases and hence the pulse width $\tau$ decreases. Here, it is a matter of course that the discharging time of the capacitor 314 must be selected in accordance with the quantity of fuel required by the engine, and if the charging time of the capacitor 314 in the monostable circuit 300 (i.e., the $\beta_1° - \alpha_1°$, $\beta_2° - \alpha_2°$, $\beta_3° - \alpha_3°$ and $\beta_4° - \alpha_4°$ of crank travel, respectively) is selected sufficiently short, even under high speed, high load operating conditions of the engine (with an increase in the number of revolutions and the amount of air drawn into the engine) the charging and discharging of the capacitor 314 are prevented from overlapping on each other and the proper pulse signals may be generated at the point I or the output terminal of the monostable circuit 300. The pulse signals are then applied to the distributing circuit 400 and are subjected to frequency division by the two-stage counter 401 which is reset by the "1" signal generated at the point E of the waveform reshaping circuit 100, and the output signals shown by the waveforms (J) and (K) of FIG. 4 are generated respectively at its first-stage output terminal or a point J and its second-stage output terminal or a point K. The combinations of the signals (J, K) at the points J and K are decoded by the decoder 402 so that the signals at output terminals $Q_1$, $Q_2$, $Q_3$ and $Q_4$ of the decoder 402 sequentially change from the "0" to "1" in accordance with the signal combinations ("1", "1"), ("0", "1"), ("1", "0") and ("0", "0"). Since, in this way, the "1" signal is sequentially generated at each of the output terminals $Q_1$, $Q_2$, $Q_3$ and $Q_4$ of the decoder 402, in response to the generation of the "1" signals from the monostable circuit 300 as shown by the waveform (I) of FIG. 4, the "1" signals which rise respectively at the crank angles $\alpha_1°$, $\alpha_2°$, $\alpha_3°$ and $\alpha_4°$ as shown by the waveforms (L), (M), (N) and (O) of FIG. 4 are sequentially generated by the AND gates 403, 404, 405 and 406 in this order. Consequently, the transistors 501, 502, 503 and 504 are sequentially turned on in this order and the fuel injection valves 4a, 4b, 4d are respectively opened at the crank angles $\alpha_1°$, $\alpha_2°$, $\alpha_3°$ and $\alpha_4°$. The duration of the opening of the fuel injection valves corresponds to the time width $\tau$ of the pulse signals generated from the monostable circuit 300, and the fuel is injected for a duration of time corresponding to the pulse width $\tau$ into the respective cylinders of the engine 1 in turn in accordance with the firing order. The experiments conducted by the inventors showed that when the charging of the capacitor 314 was completed in 90° of crank travel by the main computing means as described in connection with the illustrated embodiment, a quantity of fuel as required by the engine 1 was injected separately into the respective cylinders in accordance with their firing order. In this case, since the crank angles $\alpha°$ ($\alpha_1°$, $\alpha_2°$, $\alpha_3°$, and $\alpha_4°$) determine the timing of fuel injection, it is of course necessary to adjust the charge starting crank angles $\beta°$ ($\beta_1°$, $\beta_2°$, $\beta_3°$, and $\beta_4°$) of the capacitor 314 to determine the crank-angle charging time ($\beta° - \alpha°$) of the capacitor 314.

It should be noted that the fuel injection system according to the present invention can be installed in all types of reciprocating internal combustion engines, and particularly it can be installed with a great advantage in a type of internal combustion engines in which the air-fuel mixture can be separated into rich and lean strata in the combustion chamber of each cylinder by means of a single feed system. In a so-called stratified charge internal combustion engine, a sub-combustion chamber is provided in a main combustion chamber so that the fuel injected from a fuel injection valve is mostly drawn along with air through an intake valve provided at the connection between the combustion chamber and a suction duct into the sub-combustion chamber and a rich mixture stratum is formed in the sub-combustion chamber. On the other hand, that part of the fuel which has not been drawn into the sub-combustion chamber forms a lean mixture stratum in the main combustion chamber. After the engine has proceeded to the compression stroke, the rich mixture stratum is ignited by a spark plug and the resulting flame propagates from the sub-combustion chamber into the main combustion chamber thus completely burning the lean mixture in the main combustion chamber. Consequently, there is no problem of harmful exhaust gases due to the incomplete combustion of air-fuel mixture. Thus, the fuel injection system of the invention wherein fuel is injected separately into the respective cylinders of an internal combustion engine in synchronism with the rotation of the engine can be advantageously installed particularly in a stratified charge internal combustion engine. If the system of this invention is installed in an internal combustion engine having $n$ cylinders, it is necessary to complete the charging of electric energy in $720°/2n$ of crank travel.

What is claimed is:

1. A fuel injection system for an internal combustion multi-cylinder engine comprising:

fuel injection means for injecting fuel under a predetermined pressure into each of a plurality of cylinders in said engine;

an air-flow sensor arranged in the suction duct of said engine for generating a first electrical signal corresponding to the quantity of air drawn into said engine;

a reference signal generating means adapted to be connected to the crankshaft of said engine and having a rotor associated with said crankshaft and provided with as many equispaced means thereon as the number of said cylinders, a pair of detecting means arranged to generate a pair of signals upon engagement with said equispaced means in less than $720°/(2 \times$ the number of cylinders) of rotation of the crank shaft, and a flip-flop connected to said detecting means for generating a second electrical signal having a time width equal to the internal between said pair of signals;

main computing means connected to said air-flow sensor and said reference signal generating means for repeating, in accordance with said first and second electrical signals, the charging and discharging of electrical energy, said charging being completed during said time width of said second electrical signal, said discharging beginning after completion of said charging, said main computing means generating, during the discharging, a third electrical signal for controlling the operating time and the operating time duration of said fuel injection means; and distributing means connected between said main computing means and said fuel injection means for separately distributing said third electrical signal to said fuel injection means in accordance with the firing order of said engine.

2. A fuel injection system according to claim 1, wherein said main computing means include a capacitor adapted for storing and discharging the electrical energy, and current regulating means for converting said second electrical signal into a constant current is connected to one end of said capacitor.

3. A fuel injection system according to claim 1, wherein said charging is made by a constant current and said discharging is made by a current corresponding to the quantity of air drawn in said engine.

4. A fuel injection system according to claim 1, wherein said charging is made by a current corresponding to the quantity of air drawn in said engine and said discharging is made by a constant current.

* * * * *